US010352492B2

(12) United States Patent
Hasunuma

(10) Patent No.: US 10,352,492 B2
(45) Date of Patent: Jul. 16, 2019

(54) COUPLING DEVICE

(71) Applicant: Surpass Industry Co., Ltd., Saitama (JP)

(72) Inventor: Masahiro Hasunuma, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 141 days.

(21) Appl. No.: 15/240,764

(22) Filed: Aug. 18, 2016

(65) Prior Publication Data

US 2017/0059076 A1 Mar. 2, 2017

(30) Foreign Application Priority Data

Aug. 26, 2015 (JP) ................................ 2015-166513

(51) Int. Cl.
| | |
|---|---|
| *F16K 17/04* | (2006.01) |
| *F16L 55/07* | (2006.01) |
| *F16L 27/11* | (2006.01) |
| *F16L 37/36* | (2006.01) |
| *F16K 31/12* | (2006.01) |

(52) U.S. Cl.
CPC .............. *F16L 55/07* (2013.01); *F16K 17/04* (2013.01); *F16K 31/12* (2013.01); *F16L 27/11* (2013.01); *F16L 37/36* (2013.01); *F16L 2201/20* (2013.01)

(58) Field of Classification Search
CPC ....... F16L 2201/20; F16L 27/11; F16L 37/32; F16L 37/36; F16L 55/07; F16L 29/002; F16L 29/007; F16K 17/04; Y10T 137/87973
USPC ................................... 137/614.06
See application file for complete search history.

(56) References Cited

U.S. PATENT DOCUMENTS 2,163,255 A * 6/1939 Binder ...................... F16F 9/18
137/454.5
4,154,434 A * 5/1979 Wallis ................... F16F 9/0209
264/119

(Continued)

FOREIGN PATENT DOCUMENTS

DE          10123459 C1     5/2002
JP          H8-296782 A     11/1996

OTHER PUBLICATIONS

Extended Search Report for European Appl. No. 16185128.2 dated Jan. 20, 2017.

*Primary Examiner* — Mary E McManmon
*Assistant Examiner* — Richard K. Durden
(74) *Attorney, Agent, or Firm* — MH2 Technology Law Group, LLP

(57) ABSTRACT

Provided is a coupling device including a cylindrical housing portion, a valve portion that turns into an open state by contact with the plug device, a bellows portion having therein an expandable and contractible supply passage for supplying incompressible fluid from the plug device to a supply tube, a moving portion being movable to be brought into contact with or distanced from the plug device fitted inside one end side of the housing portion, a first pressure chamber generating a biasing force in a direction to distance the moving portion from the plug device and contract the bellows portion, and a safety valve for discharging the incompressible fluid within the supply passage to the outside when the incompressible fluid within the supply passage reaches or exceeds a predetermined level.

7 Claims, 9 Drawing Sheets

(56) References Cited

U.S. PATENT DOCUMENTS

| | | | | |
|---|---|---|---|---|
| 4,463,663 A * | 8/1984 | Hanson, Jr. | ............ | F15B 15/149 |
| | | | | 92/168 |
| 4,844,123 A * | 7/1989 | Wick | .................... | F16L 37/107 |
| | | | | 137/322 |
| 7,677,155 B2 * | 3/2010 | Marriott | ................ | F04B 1/0448 |
| | | | | 417/379 |
| 2003/0102031 A1 * | 6/2003 | Igarashi | .............. | F16K 17/0433 |
| | | | | 137/469 |
| 2005/0274424 A1 * | 12/2005 | Baumhoff | ........... | F01N 13/1816 |
| | | | | 138/109 |
| 2006/0175828 A1 * | 8/2006 | Motew | .................... | F16L 27/11 |
| | | | | 285/226 |
| 2007/0246108 A1 * | 10/2007 | Conway | .................. | F16L 37/34 |
| | | | | 137/614.06 |
| 2009/0267346 A1 | 10/2009 | Masahiro | | |
| 2009/0272450 A1 * | 11/2009 | Hasunuma | .............. | F16L 37/32 |
| | | | | 138/89 |
| 2010/0001517 A1 * | 1/2010 | Hasunuma | .............. | F16L 37/40 |
| | | | | 285/315 |
| 2010/0024904 A1 * | 2/2010 | Hoffman | ................ | F17C 13/04 |
| | | | | 137/561 R |
| 2015/0377402 A1 * | 12/2015 | Boothe | ............... | F16L 55/1015 |
| | | | | 251/149.7 |

* cited by examiner

COUPLING DEVICE

CROSS-REFERENCE TO RELATED APPLICATIONS

This application is based on Japanese Patent Application No. 2015-166513, the contents of which are incorporated herein by reference in its entirety.

TECHNICAL FIELD

The present disclosure relates to a coupling device that couples a plug device for supplying incompressible fluid and a supply tube for supplying the incompressible fluid to a destination.

BACKGROUND ART

A coupling device for fluid transfer is known in the art that is used for transferring liquid such as a chemical solution between a container of a delivery truck and a storage tank (see Patent Japanese Unexamined Patent Application, Publication No. Hei 8-296782, for example).

In the coupling device disclosed in Japanese Unexamined Patent Application, Publication No. Hei 8-296782, a bellows holder, a bellows integrated with the bellows holder, and a shower ring are pressed by air pressure against a plug attached to a flexible tube, with the plug fitted inside the coupling device, so that fluid supplied through the flexible tube is allowed to move into the bellows. After the liquid transfer operation, the bellows holder, the bellows integrated with the bellows holder, and the shower ring are returned to their original position by air pressure to close a distal opening of the plug.

SUMMARY

Technical Problem

After the liquid transfer operation, the coupling device disclosed in Japanese Unexamined Patent Application, Publication No. Hei 8-296782 supplies air pressure to an air chamber between the bellows holder and a housing portion to contract the bellows, thus shutting off the supply of fluid from the flexible tube into the bellows.

When the fluid within the bellows is incompressible and a flow passage communicating with and downstream the flow passage inside the bellows is closed, however, the supply of air pressure into the air chamber after the liquid transfer will not contract the bellows but increase the pressure (internal pressure) of the fluid within the downstream flow passage. When the pressure of the fluid within the flow passage increases as the air pressure supplied to the air chamber increases, the increased fluid pressure deforms the bellows, which has a relatively low strength. If the fluid pressure becomes too high, the bellows will be deformed excessively to be broken, and the fluid within the flow passage would flow out.

The present disclosure has been made in view of the circumstances and has an object to provide a coupling device that connects a plug device for supplying incompressible fluid, to a supply tube for supplying the incompressible fluid to a destination and that prevents breakage of a bellows portion and subsequent outflow of the incompressible fluid when a biasing force is generated to contract the bellows portion while the supply tube is closed.

Solution to Problem

In order to solve the foregoing problem, the following solutions have been adopted in the present disclosure.

A coupling device in accordance with an aspect of the present disclosure is a coupling device that couples a plug device for supplying incompressible fluid, to a supply tube for supplying the incompressible fluid to a destination, the coupling device including a cylindrical housing portion configured to receive the plug device inserted at one end side and the supply tube connected at the other end side, a valve portion configured to come into contact with the plug device inserted into the housing portion to turn into an open state where the incompressible fluid enters the housing portion from the plug device, a bellows portion arranged downstream of the valve portion and having therein an expandable and contractible supply passage for supplying the incompressible fluid from the plug device to the supply tube, a moving portion configured to accommodate the valve portion and the bellows portion, the moving portion being movable along an axis of the housing portion to be brought into contact with or distanced from the plug device fitted inside the one end side of the housing portion, a biasing force generating portion configured to generate a biasing force in a direction to distance the moving portion from the plug device and contract the bellows portion, and a safety valve configured to discharge the incompressible fluid within the supply passage to the outside when the pressure of the incompressible fluid within the supply passage reaches or exceeds a predetermined level.

According to a coupling device in accordance with an aspect of the present disclosure, when the plug device is inserted into the one end side of the housing portion and brought into contact with the valve portion, the valve portion turns into the open state to allow the incompressible fluid to enter the housing portion. The incompressible fluid that has entered the housing portion is supplied through the bellows portion having the expandable and contractible supply passage formed therein, to the supply tube connected to the other end side of the housing portion. The valve portion and the bellows portion are movable along the axis of the housing portion by means of the moving portion accommodating the valve portion and the bellows portion.

In order to stop supplying the incompressible fluid from the plug device to the supply tube, the biasing force generating portion generates the biasing force in the direction to distance the moving portion from the plug device. The bellows portion is contracted as the moving portion is distanced from the plug device. At this time, if the supply tube is in a closed state, the biasing force generated by the biasing force generating portion in the direction to contract the bellows portion will not contract the bellows portion but increase the pressure (internal pressure) of the incompressible fluid within the supply passage inside the bellows portion.

According to the coupling device in accordance with an aspect of the present disclosure, when the pressure of the incompressible fluid within the supply passage reaches or exceeds the predetermined level (e.g., lower than a pressure at which the bellows portion is broken by the internal pressure), the safety valve turns into the open state and the incompressible fluid within the supply passage will be discharged to the outside. This configuration prevents the pressure of the incompressible fluid within the supply passage from exceeding the predetermined level to cause breakage of the bellows portion and subsequent outflow of the incompressible fluid.

Thus, according to the coupling device in accordance with an aspect of the present disclosure that couples the plug device for supplying the incompressible fluid, to the supply tube for supplying the incompressible fluid to the destination, even when a biasing force is generated in the direction to contract the bellows portion while the supply tube is closed, the coupling device prevents breakage of the bellows portion and subsequent outflow of the incompressible fluid.

A coupling device in accordance with an aspect of the present disclosure may further include a discharge passage member arranged between the other end side of the housing portion and the supply tube and having therein a discharge passage for supplying the incompressible fluid from the supply passage to the safety valve. The discharge passage member may be attachable to and detachable from the other end side of the housing portion.

In this way, with the discharge passage member and also the safety valve that is attached to the discharge passage member and discharges the incompressible fluid to the outside when the pressure of the supply passage inside the bellows portion reaches or exceeds the predetermined level, the coupling device prevents breakage of the bellows portion and subsequent outflow of the incompressible fluid, compared with a coupling device that is not provided with the safety valve in advance.

A coupling device in accordance with an aspect of the present disclosure may be configured such that the moving portion has an annular protruding portion that extends around the axis and in contact with an inner circumferential surface of the housing portion, and the biasing force generating portion is a first pressure chamber that is formed between a side of the annular protruding portion on the one end side and the inner circumferential surface of the housing portion and into which operational gas is introduced from the outside.

In this way, the biasing force in the direction to contract the bellows portion can be generated with the relatively simple configuration of introducing the operational gas from the outside to the first pressure chamber between the side of the annular protruding portion on the one end side and the inner circumferential surface of the housing portion.

The coupling device with the above configuration may be configured such that a second pressure chamber into which operational gas is introduced from the outside is formed between a side of the annular protruding portion on the other end side and the inner circumferential surface of the housing portion, and the second pressure chamber generates a biasing force in a direction to bring the moving portion into contact with the plug device and expand the bellows portion.

In this way, the biasing force in the direction to expand the bellows portion can be generated with the relatively simple configuration of introducing the operational gas from the outside to the second pressure chamber between the side of the annular protruding portion on the other end side and the inner circumferential surface of the housing portion.

A coupling device in accordance with an aspect of the present disclosure may further include a detecting portion arranged inside the housing portion and configured to detect incompressible fluid that flows out of the bellows portion.

In this way, the coupling device detects the incompressible fluid flowing from the supply passage inside the bellows portion out into the housing portion as a result of breakage of the bellows portion or other reasons.

Advantageous Effects

According to the present disclosure, there is provided a coupling device that connects a plug device for supplying incompressible fluid, to a supply tube for supplying the incompressible fluid to a destination and that prevents breakage of a bellows portion and subsequent outflow of the incompressible fluid when a biasing force is generated to contract the bellows portion while the supply tube is closed.

DESCRIPTION OF EMBODIMENTS

First Embodiment

Hereinafter, a coupling device 100 and a fluid supply system equipped with the coupling device 100 of the first embodiment of the present disclosure will be described with reference to the drawings.

Figure 1:
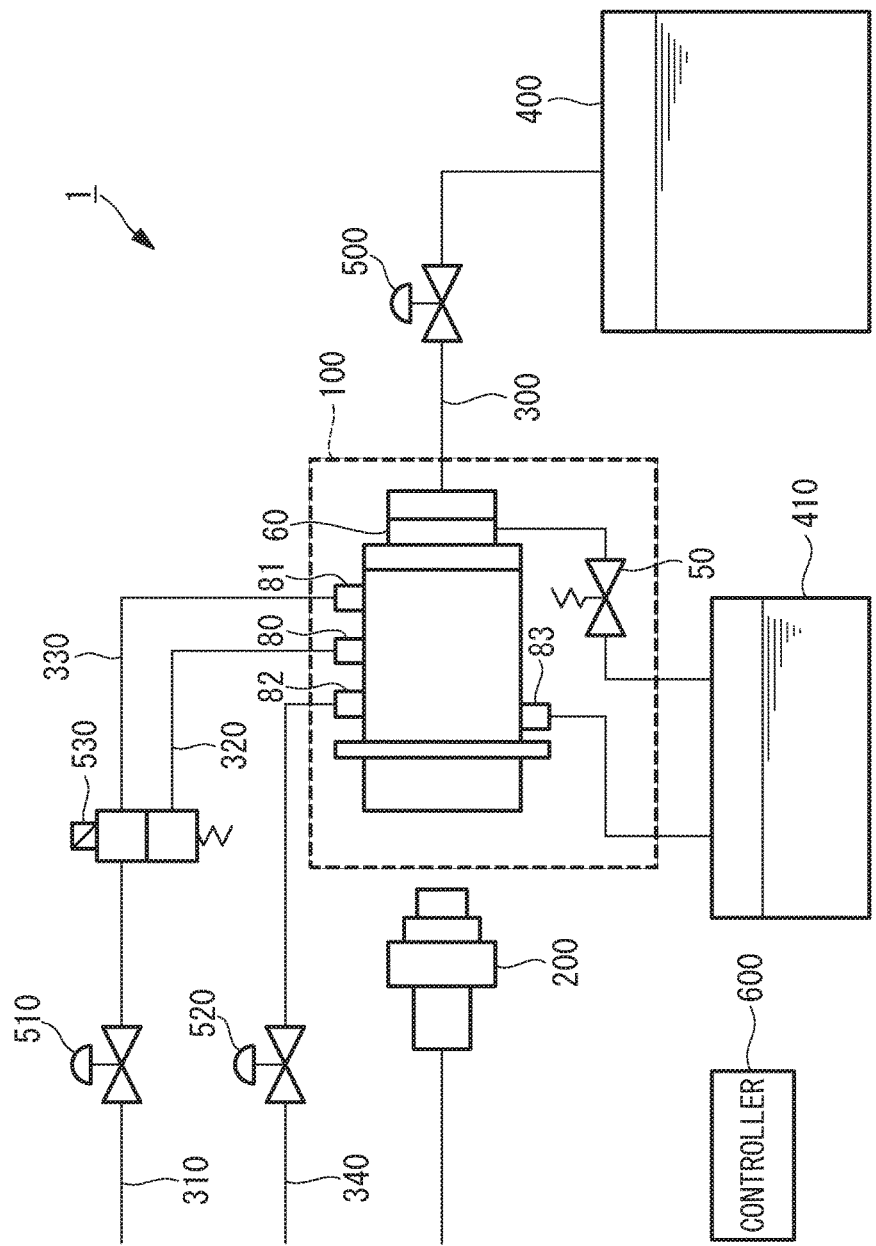
FIG. 1 illustrates the schematic configuration of a fluid supply system equipped with a coupling device of a first embodiment.

As illustrated in FIG. 1, a fluid supply system 1 of the embodiment includes a plug device 200 for supplying incompressible fluid, a supply tube 300 for supplying the incompressible fluid to a storage tank 400, which is a destination of the incompressible fluid, the coupling device 100 for coupling the plug device 200 and the supply tube 300, a drain tank 410 for temporarily storing, for example, the incompressible fluid discharged from the coupling device 100, and a controller 600 that controls the components of the fluid supply system 1.

The incompressible fluid in the embodiment is, for example, a fluid such as pure water or a chemical solution used in semiconductor manufacturing apparatuses.

As illustrated in FIG. 1, the supply tube 300 has on its flow path an on/off valve 500 that switches the supply tube 300 between an open state where the incompressible fluid flows and a closed state where the incompressible fluid does not flow.

A supply tube 310 supplies compressed air from a compressed air source (not shown) and is provided with an on/off valve 510 and a solenoid valve 530 on its flow path.

The on/off valve 510 switches between an open state where the compressed air from the compressed air source is supplied to the solenoid valve 530 and a closed state where the compressed air is not supplied to the solenoid valve 530.

The solenoid valve 530 switches whether the compressed air from the supply tube 310 is supplied via a supply tube 320 to a supply/exhaust port 80 or supplied via a supply tube 330 to a supply/exhaust port 81.

An on/off valve 520 switches between an open state where cleaning pure water supplied from a pure water supply source (not shown) via a supply tube 340 is supplied to a cleaning solution supply port 82 and a closed state where the cleaning pure water is not supplied to the cleaning solution supply port 82. After being supplied to the cleaning solution supply port 82, pure water is used to clean the inside of the coupling device 100 and then discharged to the drain tank 410 via a cleaning solution discharge port 83.

The controller 600 switches the open and closed states of the on/off valves 500, 510, and 520. The controller 600 also switches whether the solenoid valve 530 supplies the compressed air to the supply/exhaust port 80 or the supply/exhaust port 81.

The coupling device 100 includes a bypass flange 60 attached thereto, and the bypass flange 60 is connected to a safety valve 50. The bypass flange 60 and the safety valve 50 are provided for discharging the incompressible fluid flowing in the coupling device 100 to the external drain tank 410 when the pressure of the incompressible fluid within the coupling device 100 reaches or exceeds a predetermined level, as will be described later.

Next, the configuration of the coupling device 100 of the embodiment will be described in more detail.

Figure 2:
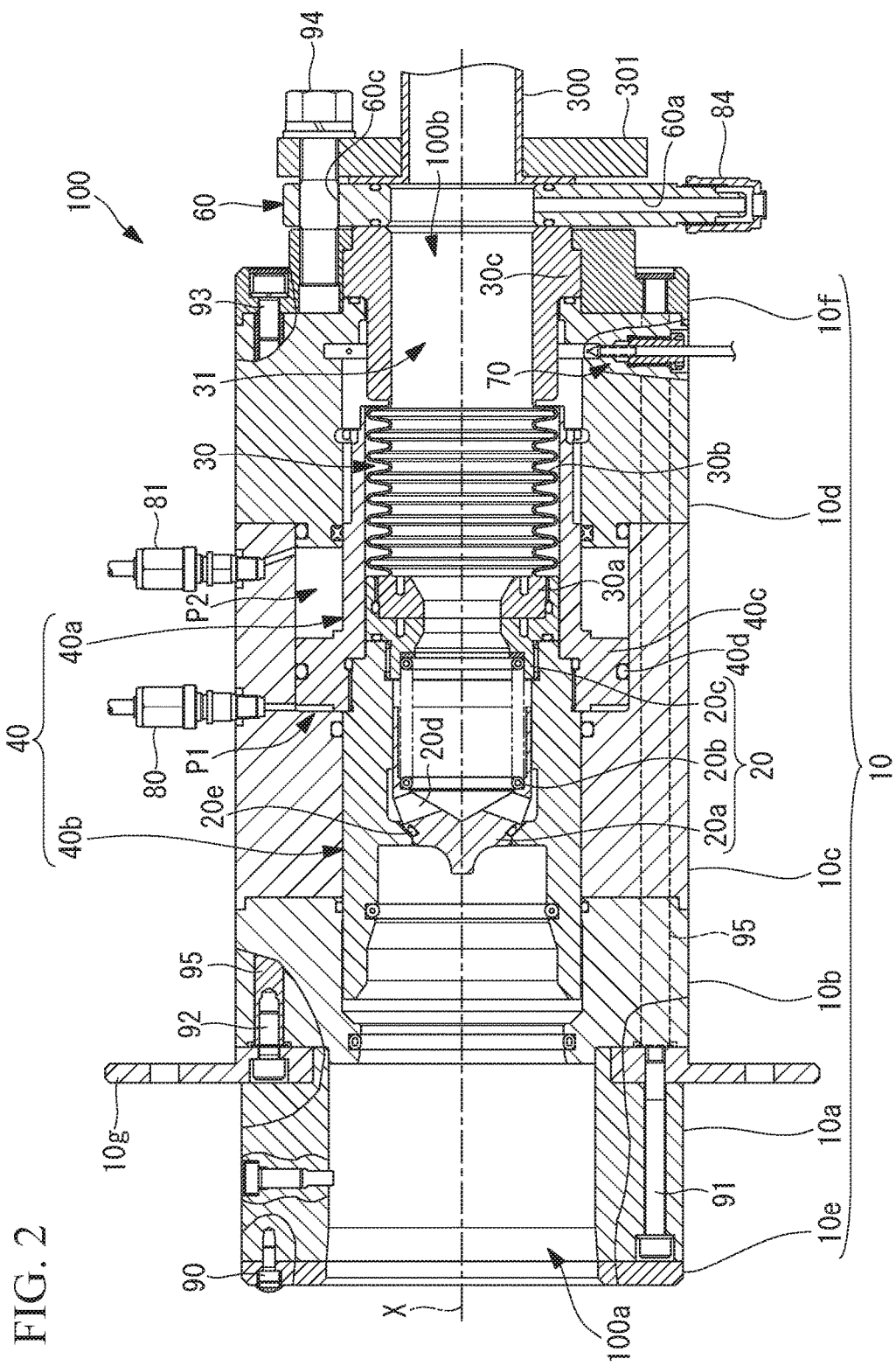
FIG. 2 is a fragmentary vertical cross-sectional view of the coupling device of the first embodiment.

As illustrated in FIG. 2, the coupling device 100 includes a housing portion 10 formed in a cylindrical shape along an axis X, a valve portion 20 that contacts the plug device 200 to turn into an open state where the incompressible fluid enters the housing portion 10 from the plug device 200, a bellows portion 30 arranged in the housing portion 10, downstream of the valve portion 20 in the flow direction of the incompressible fluid, a moving portion 40 that is movable along the axis X so as to be brought into contact with or distanced from the plug device 200, a first pressure chamber P1 (biasing force generating portion) that generates a biasing force to distance the moving portion 40 from the plug device 200, the bypass flange 60 (discharge passage member), and the safety valve 50 (refer to FIG. 1).

The housing portion 10 is formed in a cylindrical shape that extends along the axis X, and the housing portion 10 receives the plug device 200 at an inlet 100*a* on one end side of the coupling device 100 along the axis X and the supply tube 300 at an outlet 100*b* on the other end side of the coupling device 100 along the axis X.

The housing portion 10 includes a first housing section 10*a*, a second housing section 10*b*, a third housing section 10*c*, and a fourth housing section 10*d* in this order along the axis X from the inlet 100*a*.

The housing portion 10 also includes a front cover 10*e* on the side of the inlet 100*a* of the first housing section 10*a* and a back cover 10*f* on the side of the outlet 100*b* of the fourth housing section 10*d*.

Further, the housing portion 10 includes a side flange 10*g* that is formed in an annular shape extending around the axis X and arranged between the first housing section 10*a* and the second housing section 10*b*.

As illustrated in FIG. 2, the front cover 10*e* is fastened to the first housing section 10*a* by fastening bolts 90 at a plurality of locations around the axis X. The first housing section 10*a* is fastened to the side flange log by fastening bolts 91 at a plurality of locations around the axis X. The side flange 10*g* is fastened to internal threads formed on inner circumferential surfaces of shafts 95 by fastening bolts 92 at a plurality of locations around the axis X. The back cover 10*f* is fastened to the internal threads formed on the inner circumferential surfaces of the shafts 95 by fastening bolts 93 at a plurality of locations around the axis X.

The second housing section 10*b*, the third housing section 10*c*, and the fourth housing section 10*d* are integrated with each other by inserting the shafts 95 into insertion holes formed at a plurality of locations inside these sections around the axis X, fastening the fastening bolts 92 to one ends of the shafts 95 from the side flange 10*g*, and fastening the fastening bolts 93 to the other ends of the shafts 95 from the back cover 10*f*.

As described above, the first housing section 10*a*, the second housing section 10*b*, the third housing section 10*c*, and the fourth housing section 10*d* are integrally connected to each other and together form a cylindrical flow passage inside these sections 10*a* to 10*d* for passing the incompressible fluid from the inlet 100*a* to the outlet 100*b*.

The valve portion 20 includes a valve body 20*a*, a spring 20*b*, and a stopper 20*c*. The valve body 20*a* has orifices 20*d* each having a circular cross section. The orifices 20*d* regulate the inflow of the incompressible fluid flowing from the inlet 100*a* into the valve body 20*a*. The orifices 20*d* are formed at a plurality of locations around the axis X such that they are equidistant from each other.

An outer circumferential surface of the valve body 20*a* is formed in a cylindrical shape that extends along the axis X and whose diameter is slightly shorter than the diameter of an inner circumferential surface of a valve plug holder 40*b* to be described later. Thus, fitted in a space inside the valve plug holder 40*b*, the valve body 20*a* is movable along the axis X.

The stopper 20*c* is formed in an annular shape extending around the axis X and fixed to the valve plug holder 40*b* by fastening an external thread portion formed on an outer circumferential surface of the stopper 20*c* to an internal thread portion formed on an inner circumferential surface of the valve plug holder 40*b*.

The stopper 20*c* retains the spring 20*b* extending along the axis X, between itself and the valve body 20*a*. The valve body 20*a* is pressed against the inner circumferential surface of the valve plug holder 40*b* by a biasing force of the spring 20*b* trying to elongate, and thus this forms an endless seal area extending around the axis X between the valve body 20*a* and the valve plug holder 40*b*.

In the state illustrated in FIG. 2, an O ring 20*e* attached to the valve body 20*a* is in contact with the inner circumferential surface of the valve plug holder 40*b* and forms an seal area, so as to achieve a blocked state where the incompressible fluid does not flow between the inlet 100*a* and the outlet 100*b*.

The bellows portion 30 has an expandable and contractible supply passage 31 formed therein for supplying the incompressible fluid from the plug device 200 to the supply tube 300.

The bellows portion 30 includes a distal end portion 30*a*, a bellows body 30*b*, and a proximal end portion 30*c* in this order along the axis X from the inlet 100*a*. The distal end portion 30*a*, the bellows body 30*b*, and the proximal end portion 30*c* are formed integrally with each other from a fluorocarbon resin (e.g., polytetrafluoroethylene material (PTFE)).

The distal end portion 30*a* is formed in an annular shape extending around the axis X and fixed to the stopper 20*c* by fastening external threads formed on an outer circumferential surface of the distal end portion 30*a* to an internal thread portion formed on an inner circumferential surface of the stopper 20*c* close to the outlet 100*b*.

The proximal end portion 30c is formed in a cylindrical shape extending around the axis X and retained interposed between the back cover 10f and the fourth housing section 10d.

The bellows body 30b has a bellows shape that can elongate and contract along the axis X. The distal end portion 30a is movable along the axis X together with the stopper 20c and the valve plug holder 40b. On the other hand, the proximal end portion 30c is arranged fixed to the housing portion 10. In this way, the distance between the distal end portion 30a and the proximal end portion 30c in the axis X direction varies with the position of the moving portion 40. The bellows shape of the bellows body 30b allows the supply passage 31 inside the bellows portion 30 to expand and contract along the axis X.

The moving portion 40 has a cylindrical shape along the axis X and accommodates the valve portion 20 and the bellows portion 30 inside the moving portion 40. The moving portion 40 includes the valve plug holder 40b and a bellows holder 40a in this order along the axis X from the inlet 100a.

The valve plug holder 40b has external threads on its outer circumferential surface close to the outlet 100b and the bellows holder 40a has internal threads on its inner circumferential surface close to the inlet 100a. The valve plug holder 40b and the bellows holder 40a are integrated with each other by fastening the external threads of the valve plug holder 40b to the internal threads of the bellows holder 40a.

The bellows holder 40a has an annular protruding portion 40c formed in an annular shape extending along the axis X, at a perimeter portion of an end portion of the bellows holder 40a facing the inlet 100a. The annular protruding portion 40c is arranged in a cylindrical space between the third housing section 10c and the fourth housing section 10d such that the annular protruding portion 40c divides the space into the first pressure chamber P1 and a second pressure chamber P2. The annular protruding portion 40c is in contact with an inner circumferential surface of the third housing section 10c via an O ring 40d.

The first pressure chamber P1 is a space between a side of the annular protruding portion 40c facing the inlet 100a (one end side) and the inner circumferential surface of the third housing section 10c and is connected to the supply/exhaust port 80 via a through hole on an outer circumferential surface of the third housing section 10c.

The second pressure chamber P2 is a space between a side of the annular protruding portion 40c facing the outlet 100b (the other end side) and the inner circumferential surface of the third housing section 10c and is connected to the supply/exhaust port 81 via another through hole on the outer circumferential surface of the third housing section 10c.

When the compressed air (operational gas) is supplied via the supply tube 320 to the first pressure chamber P1, the first pressure chamber P1 generates a biasing force to move the annular protruding portion 40c toward the outlet 100b along the axis X. This biasing force is in a direction to contract the bellows body 30b of the bellows portion 30.

Figure 3:
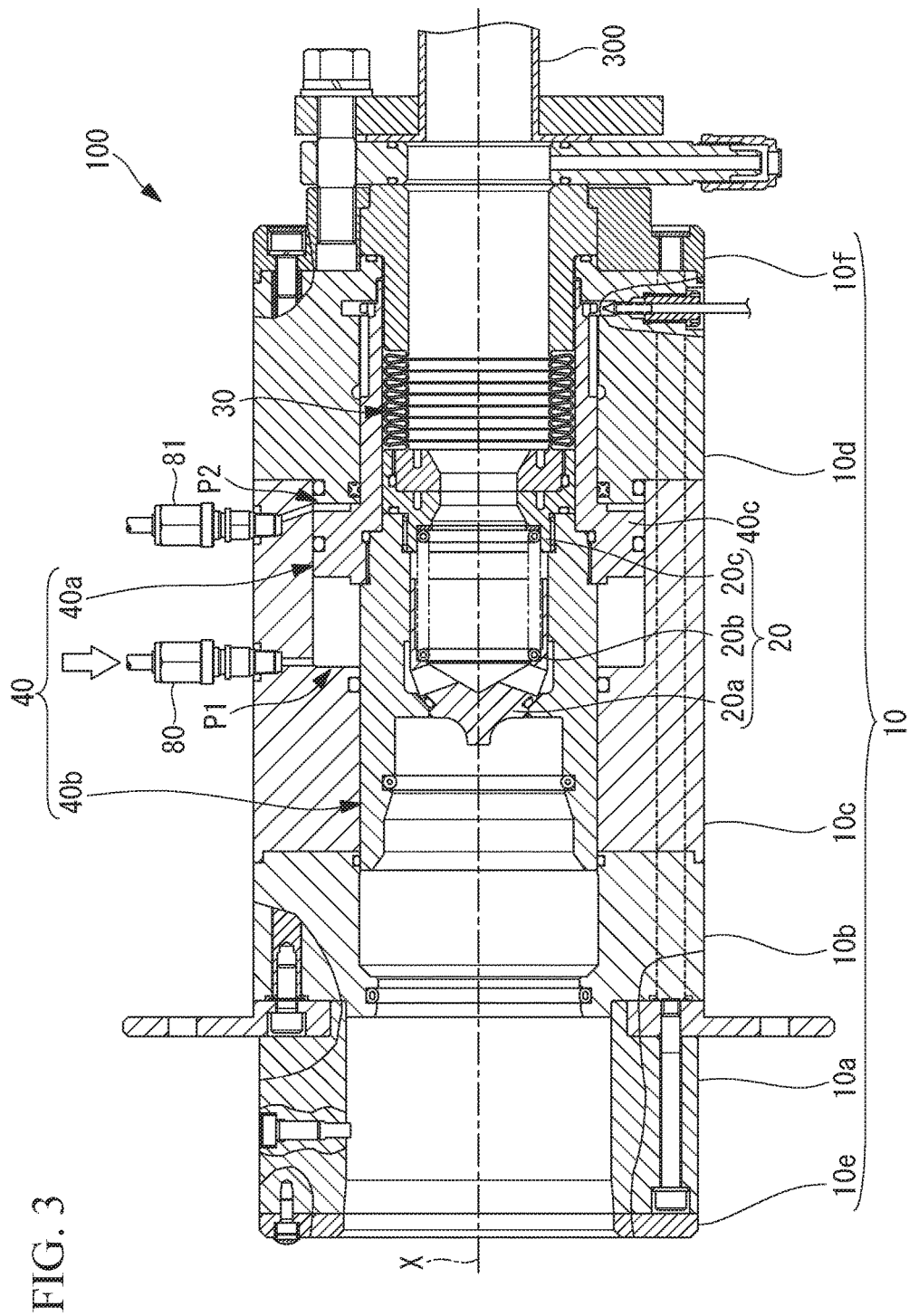
FIG. 3 illustrates the coupling device in FIG. 2 that is in a disconnected state where a plug device is not connected to the coupling device.

As illustrated in FIG. 3, the moving portion 40 moves toward the outlet 100b as the biasing force generated by the first pressure chamber P1 expands the first pressure chamber P1 while contracting the second pressure chamber P2. Accordingly, when the plug device 200 is fitted inside the inlet 100a, the moving portion 40 will be distanced from the plug device 200.

When the compressed air (operational gas) is supplied via the supply tube 330 to the second pressure chamber P2, the second pressure chamber P2 generates a biasing force to move the annular protruding portion 40c toward the inlet 100a along the axis X. This biasing force is in a direction to elongate the bellows body 30b of the bellows portion 30.

Figure 4:
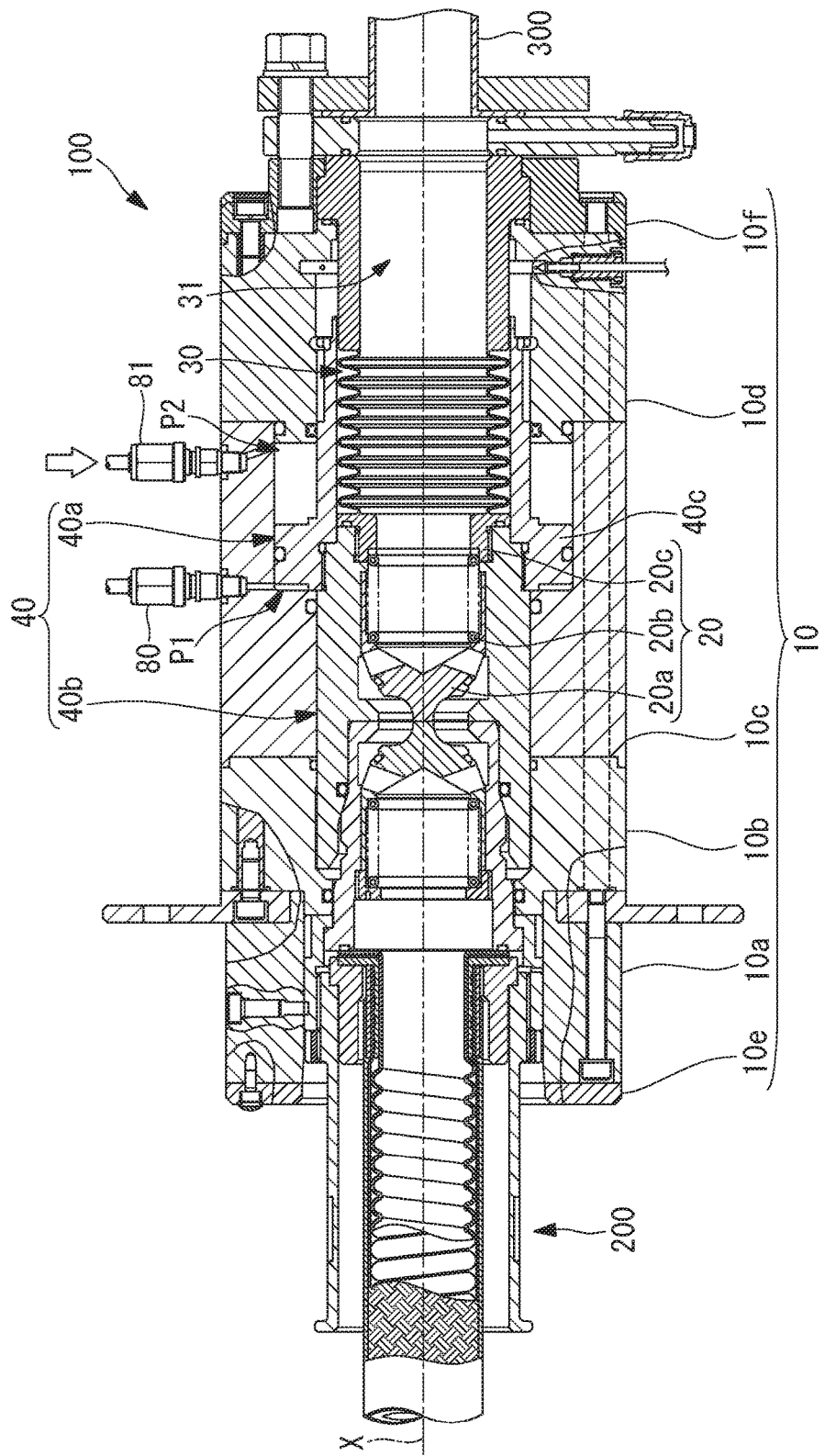
FIG. 4 illustrates the coupling device in FIG. 2 that is in a connected state where the plug device is connected to the coupling device.

As illustrated in FIG. 4, the moving portion 40 moves toward the inlet 100a as the biasing force generated by the second pressure chamber P2 expands the second pressure chamber P2 while contracting the first pressure chamber P1. Accordingly, when the plug device 200 is fitted inside the inlet 100a, the moving portion 40 will be brought into contact with the plug device 200.

When the moving portion 40 is brought into contact with the plug device 200 as illustrated in FIG. 4, an end of a valve body of a valve portion of the plug device 200 is brought into contact with an end of the valve body 20a of the valve portion 20 and the valve body 20a is distanced from an inner circumferential surface of the moving portion 40. Thus, the incompressible fluid from the valve portion of the plug device 200 enters the supply passage 31 inside the bellows portion 30 to be supplied to the supply tube 300.

Next, a description will be given of a structure for discharging the incompressible fluid flowing in the coupling device 100 to the external drain tank 410 when the pressure of the incompressible fluid flowing in the coupling device 100 reaches or exceeds the predetermined level.

The bypass flange 60 illustrated in FIG. 2 is an annular plate-shaped member arranged between the outlet 100b side of the housing portion 10 and the supply tube 300. The bypass flange 60 has a discharge passage 60a formed therein for supplying the incompressible fluid from the supply passage 31 to the safety valve 50. A nut 84 (refer to FIG. 5) is fastened to a leading end of the discharge passage 60a and connected to a tube that guides the incompressible fluid to the safety valve 50.

The bypass flange 60 is made of a fluorocarbon resin material (e.g., PTFE), for example.

As illustrated in FIG. 2, the leading end of the discharge passage 60a at which the nut 84 is fastened is positioned outward beyond a radially outer edge (the edge in a direction orthogonal to the axis X) of the back cover 10f. The leading end of the discharge passage 60a is positioned outward beyond a radially outer edge of a mounting flange 301 to be described later. Accordingly, there is no back cover 10f nor mounting flange 301 around the nut 84 in mounting the nut 84 to the discharge passage 60a, making it easy to mount the nut 84.

Figure 5:
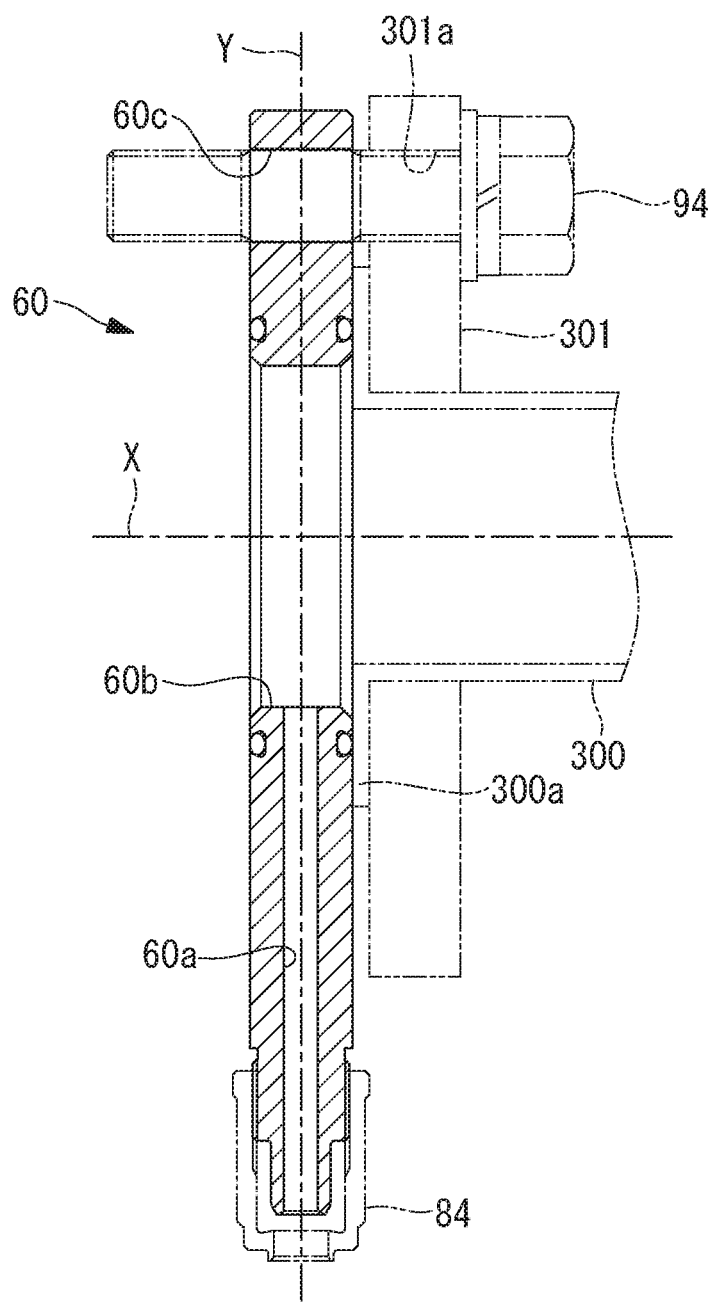
FIG. 5 is a vertical cross-sectional view of a bypass flange illustrated in FIG. 2.

As illustrated in FIG. 5, the bypass flange 60 has a communication passage 60b formed therein that extends along the axis X and communicates the supply passage 31 to the supply tube 300. The discharge passage 60a is a flow passage extending along an axis Y orthogonal to the axis X.

Figure 6:
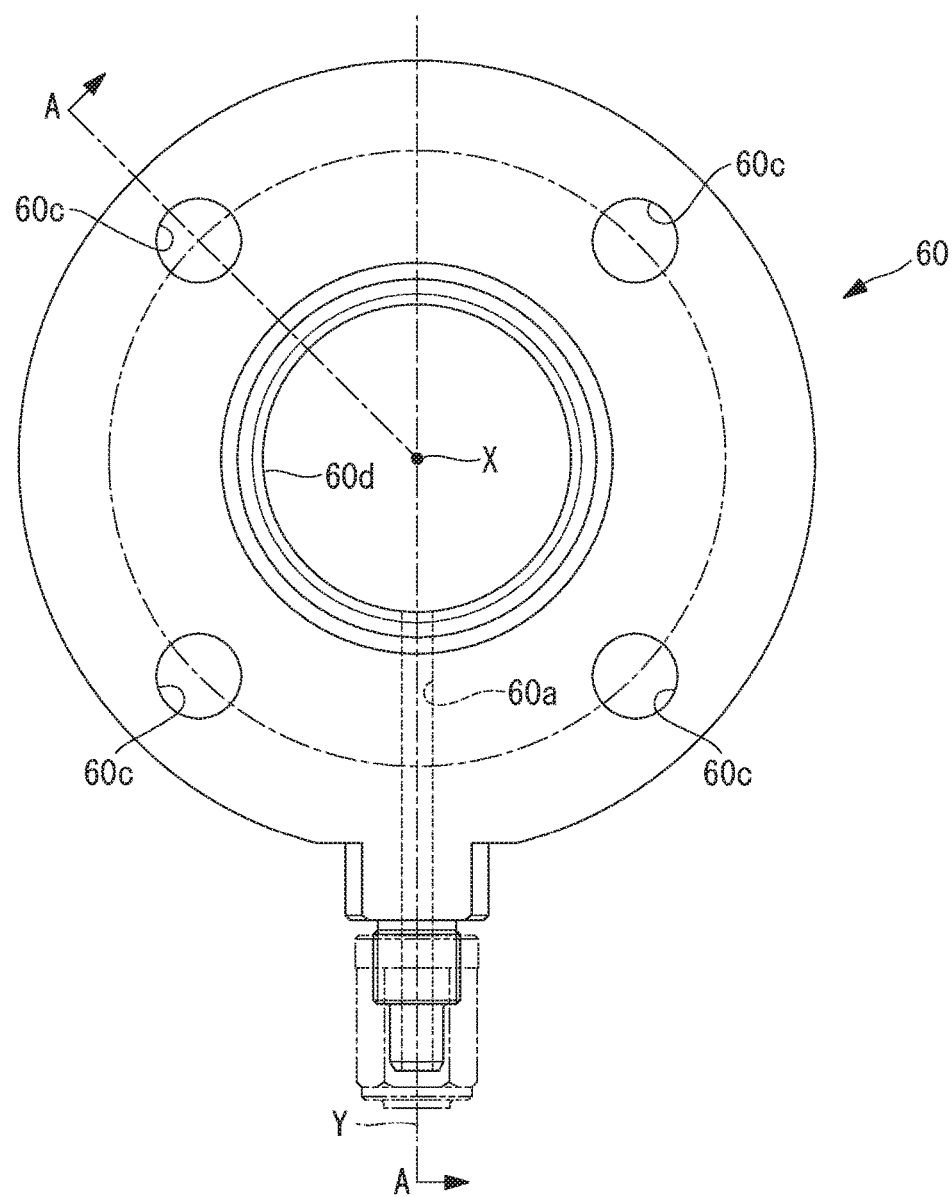
FIG. 6 is a side view of the bypass flange illustrated in FIG. 2.

As illustrated in FIG. 6 (a side view of the bypass flange illustrated in FIG. 2), the bypass flange 60 has through holes 60c at a plurality of locations in a circumferential direction of the bypass flange 60, around the axis X. As illustrated in FIG. 2, fastening bolts 94 are inserted into the through holes 60c.

FIG. 5 illustrates the bypass flange 60 in a vertical cross section taken along the line A-A in FIG. 6.

As illustrated in FIG. 5, the supply tube 300 has a flange portion 300a at an end of the supply tube 300 arranged on the side of the bypass flange 60. The mounting flange 301 is arranged to sandwich the flange portion 300a between itself and the bypass flange 60 along the axis X. The mounting flange 301 is formed in an annular shape about the axis X.

The mounting flange 301 has through holes 301a into which the fastening bolts 94 are inserted.

The fastening bolts 94 are fastened to the back cover 10f through the through holes 301a of the mounting flange 301 and the through holes 60c of the bypass flange 60.

The bypass flange 60 can be detached from the outlet 100b side (the other end side) of the housing portion 10 as the fastening bolts 94 are unfastened from the back cover 10f.

In this way, the bypass flange 60 is attached to and detached from the outlet 100b side (the other end side) of the housing portion 10.

Figure 7:
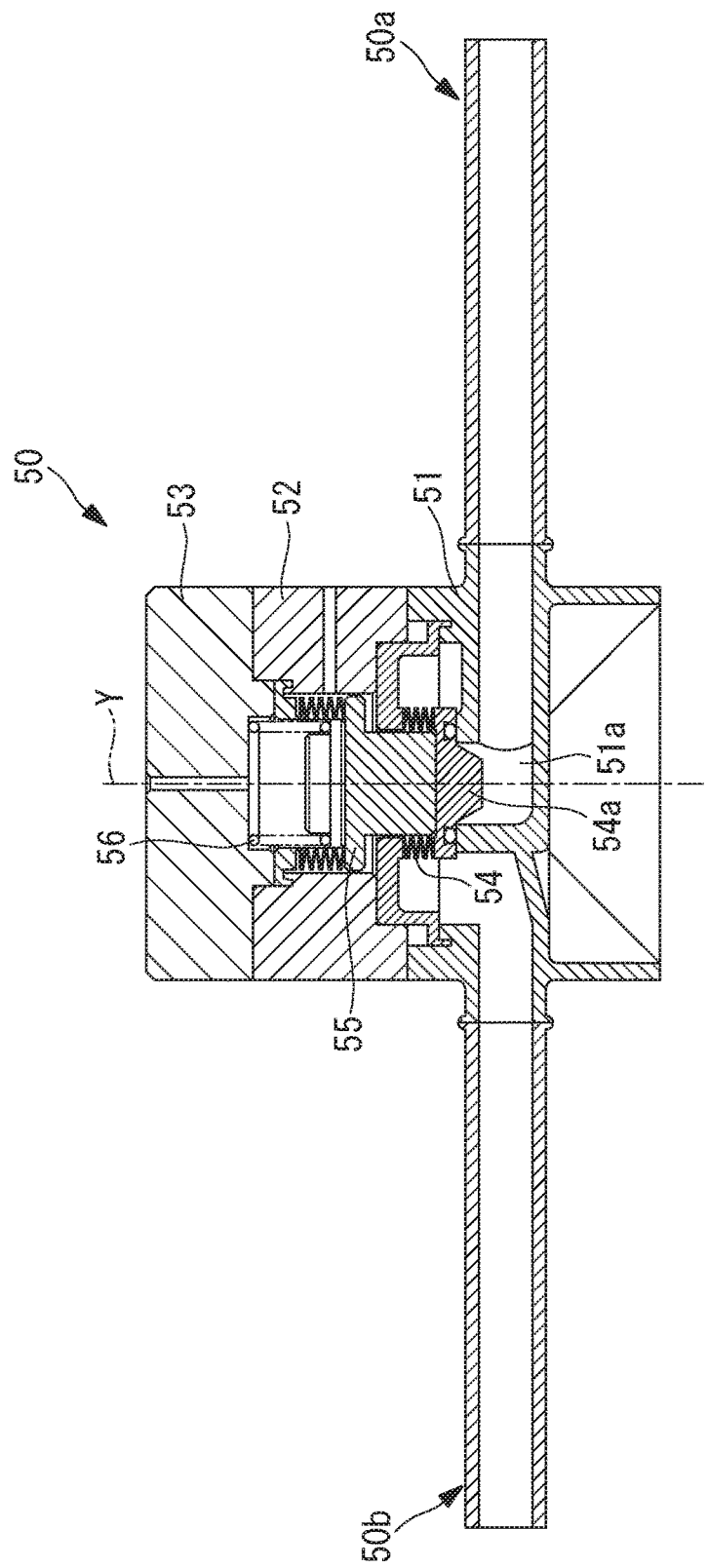
FIG. 7 is a fragmentary vertical cross-sectional view of a safety valve illustrated in FIG. 1.

The incompressible fluid that has been guided into the discharge passage 60a of the bypass flange 60 illustrated in FIG. 6 is guided to an inlet 50a of the safety valve 50 illustrated in FIG. 7.

The safety valve 50 in FIG. 7 discharges the incompressible fluid within the supply passage 31 to the outside when the pressure of the incompressible fluid within the supply passage 31 of the coupling device 100 reaches or exceeds the predetermined level.

Here, when the pressure of the incompressible fluid guided from the plug device 200 to the coupling device 100 is 0.3 MPa, the predetermined pressure may be set to 0.45 MPa, for example. The predetermined pressure is set in advance by appropriately adjusting a biasing force applied by a spring 56 to be described later.

The safety valve 50 includes a body 51 having a flow passage that guides the incompressible fluid from the inlet 50a to an outlet 50b, a body 52 arranged above the body 51, and a body 53 arranged further above the body 52. The bodies 51 to 53 are coupled to each other by a plurality of fastening bolts (not shown) extending in the direction parallel with the axis Y.

The body 51 has a valve orifice 51a that opens upward along the axis Y. A bellows valve 54 is arranged above the valve orifice 51a. The bellows valve 54 includes a valve portion 54a that is brought into contact with or distanced from the valve orifice 51a along the axis Y.

A connecting portion 55 is arranged in contact with an upper surface of the valve plug portion 54a. The connecting portion 55 receives a downward biasing force along the axis Y, from the spring 56 that is arranged with its upper end in contact with the body 53.

While the bellows valve 54 is used as the safety valve 50 in this embodiment, a diaphragm valve may be employed instead of the bellows valve.

The biasing force applied to the connecting portion 55 by the spring 56 downward along the axis Y will be transferred to the upper surface of the valve portion 54a. The valve portion 54a receives an upward pressure along the axis Y by the incompressible fluid present in the flow passage inside the body 51, in the blocked state where the valve orifice 51a is closed.

Thus, the valve portion 54a receives the downward biasing force along the axis Y from the spring 56 as well as the upward biasing force along the axis Y from the incompressible fluid.

Accordingly, the valve portion 54a is distanced from the valve orifice 51a when the biasing force applied to valve portion 54a by the incompressible fluid exceeds the biasing force applied by the spring 56. As the valve portion 54a is distanced from the valve orifice 51a, the safety valve 50 is turned into a fluid communication state where the incompressible fluid from the inlet 50a flows toward the outlet 50b. The incompressible fluid discharged from the outlet 50b will be guided into the drain tank 410 illustrated in FIG. 1.

By using the above described bypass flange 60 and safety valve 50, the incompressible fluid flowing in the coupling device 100 is discharged via the safety valve 50 to the external drain tank 410 when the pressure of the incompressible fluid in the coupling device 100 reaches or exceeds the predetermined level. This prevents the bellows body 30b from being broken by application of an excessive pressure to the bellows portion 30.

A leak sensor 70 illustrated in FIG. 2 is arranged inside the housing portion 10 and detects incompressible fluid flowing out of the bellows portion 30.

The leak sensor 70 will detect incompressible fluid flowing into a space between an inner circumferential surface of the fourth housing section 10d and an outer circumferential surface of the proximal end portion 30c of the bellows portion 30, and transmits a detection signal to the controller 600.

A description will be given of the operation and effect of the coupling device 100 of the embodiment described above.

According to the coupling device 100 of the embodiment, when the plug device 200 is inserted into the inlet 100a side of the housing portion 10 and brought into contact with the valve portion 20, the valve portion 20 turns into the open state to allow the incompressible fluid to enter the housing portion 10. The incompressible fluid that has entered the housing portion 10 is supplied through the bellows portion 30 having the expandable and contractible supply passage 31 formed therein, to the supply tube 300 connected to the outlet 100b side of the housing portion 10. The valve portion 20 and the bellows portion 30 are movable along the axis X of the housing portion 10 by means of the moving portion 40 accommodating the valve portion 20 and the bellows portion 30.

In order to stop supplying the incompressible fluid from the plug device 200 to the supply tube 300, the first pressure chamber P1 generates the biasing force in the direction to distance the moving portion 40 from the plug device 200. The bellows body 30b of the bellows portion 30 is contracted as the moving portion 40 is distanced from the plug device 200. At this time, if the supply tube 300 is in a blocked state, the biasing force generated by the first pressure chamber P1 in the direction to contract the bellows portion 30 will not contract the bellows portion 30 but increase the pressure (internal pressure) of the incompressible fluid within the supply passage 31 inside the bellows portion 30.

According to the coupling device 100 of the embodiment, when the pressure of the incompressible fluid within the supply passage 31 reaches or exceeds the predetermined level (e.g., lower than a pressure at which the bellows portion 30 is broken by the internal pressure), the safety valve 50 turns into the open state and the incompressible fluid within the supply passage 31 will be discharged via the bypass flange 60 and the safety valve 50 to the drain tank 410. This configuration prevents the pressure of the incompressible fluid within the supply passage 31 from exceeding the predetermined level to cause breakage of the bellows portion and subsequent outflow of the incompressible fluid.

Thus, according to the coupling device 100 of the embodiment that couples the plug device 200 for supplying the incompressible fluid, to the supply tube 300 for supplying the incompressible fluid to the destination, even when a biasing force is generated in the direction to contract the bellows portion 30 while the supply tube 300 is closed, the coupling device 100 prevents breakage of the bellows portion 30 and subsequent outflow of the incompressible fluid.

The coupling device 100 of the embodiment includes the bypass flange 60 that is arranged between the outlet 100b side of the housing portion 10 and the supply tube 300 and has the discharge passage 60a formed therein for supplying the incompressible fluid from the supply passage 31 to the safety valve 50. The bypass flange 60 is detachable from the outlet 100b side of the housing portion 10.

In this way, with the bypass flange 60 and also the safety valve 50 that is attached to the bypass flange 60 and discharges the incompressible fluid to the outside when the pressure of the supply passage 31 inside the bellows portion 30 reaches or exceeds the predetermined level, the coupling device 100 prevents breakage of the bellows portion 30 and subsequent outflow of the incompressible fluid, compared with a coupling device 100 that is not provided with the safety valve 50 in advance.

The moving portion 40 of the coupling device 100 of the embodiment has the annular protruding portion 40c that extends around the axis X and is in contact with the inner circumferential surface of the housing portion 10. The first pressure chamber P1 is the space that is formed between the side of the annular protruding portion 40c facing the inlet 100a and the inner circumferential surface of the housing portion 10 and into which the compressed air is introduced from the outside.

In this way, the biasing force to contract the bellows portion 30 can be generated by the relatively simple configuration of introducing the compressed air from the outside to the first pressure chamber P1 between the side of the annular protruding portion 40c facing the inlet 100a and the inner circumferential surface of the housing portion 10.

The coupling device 100 of the embodiment also has the second pressure chamber P2 into which the compressed air is introduced from the outside, between the side of the annular protruding portion 40c facing the outlet 100b and the inner circumferential surface of the housing portion 10. The second pressure chamber P2 generates the biasing force in the direction to bring the moving portion 40 into contact with the plug device 200 and expand the bellows portion 30.

In this way, the biasing force in the direction to expand the bellows portion 30 can be generated with the relatively simple configuration of introducing the compressed air from the outside to the second pressure chamber P2 between the side of the annular protruding portion 40c facing the outlet 100b and the inner circumferential surface of the housing portion 10.

The coupling device 100 of the embodiment includes the leak sensor 70 that is arranged inside the housing portion 10 and detects incompressible fluid flowing out of the bellows portion 30.

In this way, the coupling device 100 detects the incompressible fluid flowing from the supply passage 31 inside the bellows portion 30 out into the housing portion 10 as a result of breakage of the bellows portion 30 or other reasons, and notifies the controller 600 of the outflow.

Second Embodiment

Hereinafter, a coupling device 100' of a second embodiment of the present disclosure will be described with reference to the drawings.

The coupling device 100' of the embodiment is a modification of the coupling device 100 of the first embodiment, and is similar to the first embodiment unless otherwise described hereinafter.

The coupling device 100 of the first embodiment is provided with the bypass flange 60 attachable to and detachable from the housing portion 10 and the bypass flange 60 is coupled to the safety valve 50 via the tube.

In contrast, the coupling device 100' of the embodiment has a fifth housing section 10h arranged between a back cover 10f and the proximal end portion 30c of the bellows portion 30, and a safety valve 50' is incorporated in the fifth housing section 10h.

Figure 8:
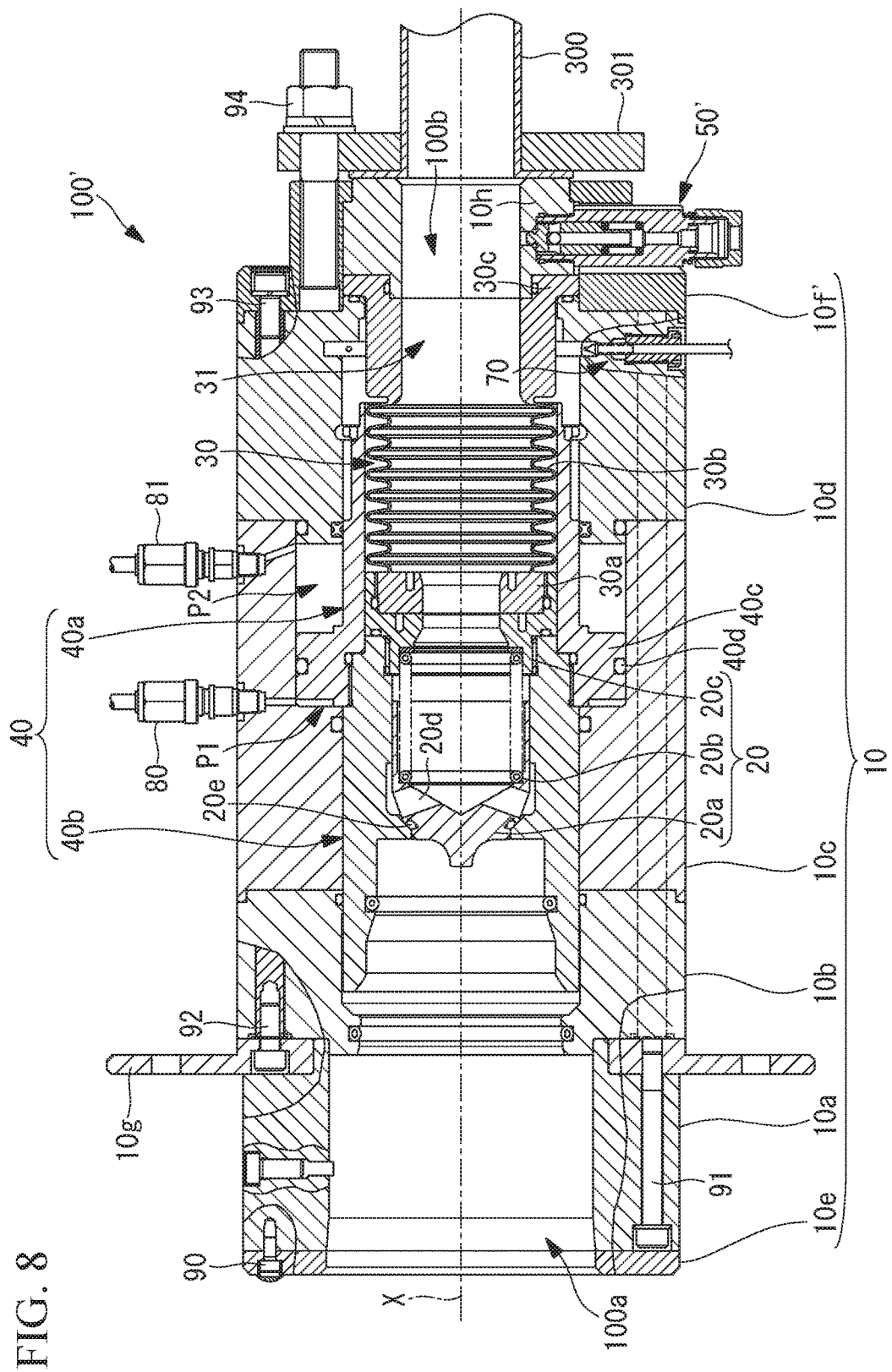
FIG. 8 is a fragmentary vertical cross-sectional view of a coupling device of a second embodiment.

As illustrated in FIG. 8, the fifth housing section 10h is a cylindrical member extending along the axis X. The fifth housing section 10h is fixed between the back cover 10f and the proximal end portion 30c of the bellows portion 30 by the back cover 10f. The fifth housing section 10h has a through hole on its inner circumferential surface to guide the incompressible fluid to the safety valve 50'.

Figure 9:
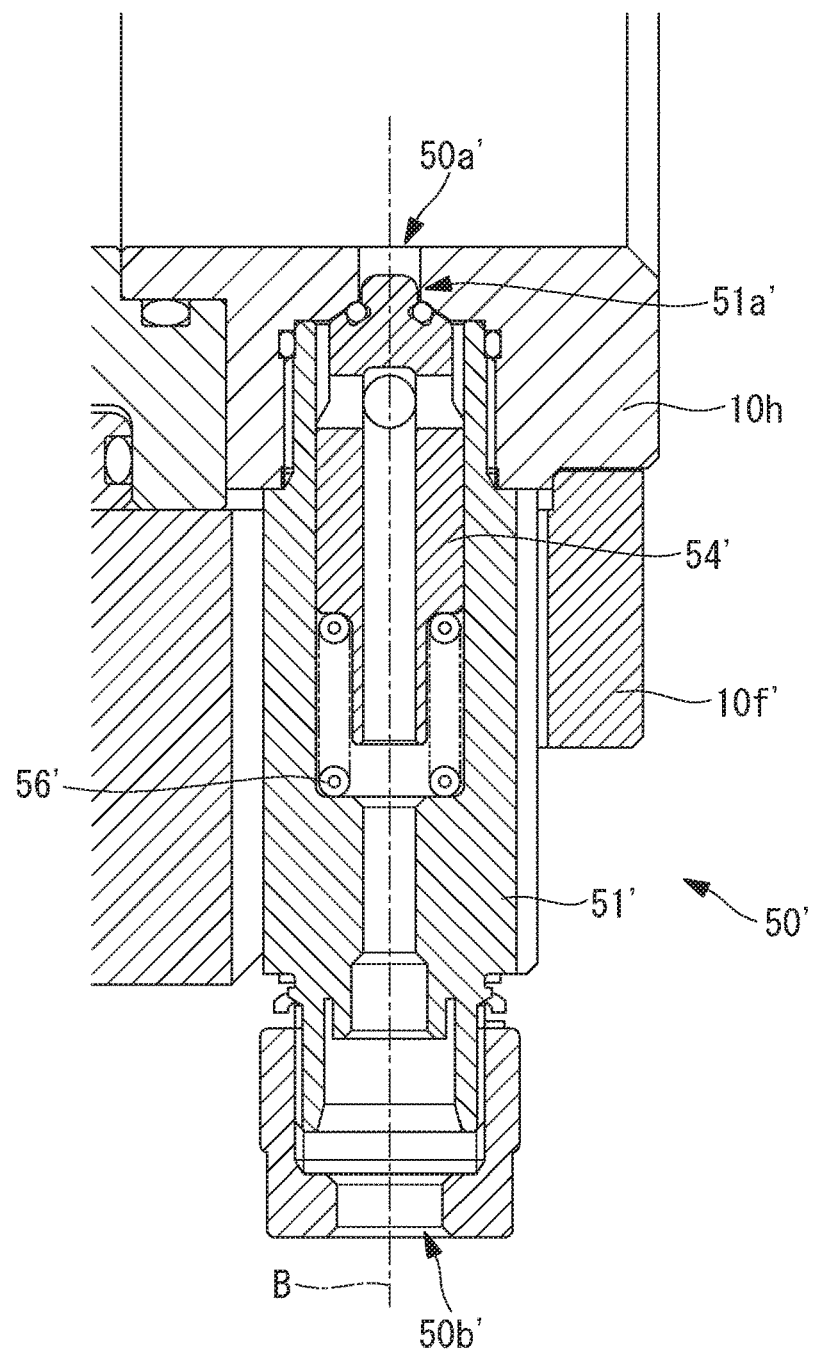
FIG. 9 is a vertical cross-sectional view of the safety valve illustrated in FIG. 8.

As illustrated in FIG. 9, the safety valve 50' has a body 51' having a flow passage formed therein for guiding the incompressible fluid from an inlet 50a' communicating with the supply passage 31 to an outlet 50b'. The body 51' has a valve orifice 51a' that opens along an axis B. A valve portion 54' is arranged below the valve orifice 51a'. The valve portion 54' is brought into contact with or distanced from the valve orifice 51a' along the axis B.

The valve portion 54' receives an upward biasing force along the axis B from a spring 56' arranged with its lower end in contact with the body 51'.

The valve portion 54' receives a downward pressure along the axis B by incompressible fluid present at the inlet 50a', in a blocked state where the valve orifice 51a' is closed.

Thus, the valve portion 54' receives the upward biasing force along the axis B from the spring 56' as well as the downward biasing force along the axis B from the incompressible fluid.

Accordingly, the valve portion 54' is distanced from the valve orifice 51a' when the biasing force applied to the valve portion 54' by the incompressible fluid exceeds the biasing force applied by the spring 56'. As the valve portion 54' is distanced from the valve orifice 51a', the safety valve 50' is turned into a fluid communication state where the incompressible fluid from the inlet 50a' flows toward the outlet 50b'. The incompressible fluid discharged from the outlet 50b' is guided into the drain tank 410 illustrated in FIG. 1.

By using the above described fifth housing section 10h and safety valve 50', the incompressible fluid in the coupling device 100' is discharged via the safety valve 50' to the outside drain tank 410 when the pressure of the incompressible fluid flowing in the coupling device 100' reaches or exceeds the predetermined level. This prevents the bellows body 30b from being broken by application of an excessive pressure.

In addition, the coupling device 100' of the embodiment, which has the safety valve 50' incorporated in the fifth housing section 10h, can be simplified and reduced in size.

In addition, the present invention is not limited to the foregoing embodiments, and modifications may be made as appropriate without departing from the scope of the present invention.

The invention claimed is:

1. A coupling device that couples a plug device for supplying incompressible fluid, to a supply tube for supplying the incompressible fluid to a destination, the supply tube having a flange portion at an end thereof, the coupling device comprising:
   a cylindrical housing portion configured to receive the plug device inserted at one end side and the supply tube fluidly connected at the other end side;
   a valve portion configured to come into contact with the plug device inserted into the housing portion to turn into an open state where the incompressible fluid enters the housing portion from the plug device;

a bellows portion arranged downstream of the valve portion and having therein an expandable and contractible supply passage for supplying the incompressible fluid from the plug device to the supply tube;

a moving portion configured to accommodate the valve portion and the bellows portion, the moving portion being movable along an axis of the housing portion to be brought into contact with or distanced from the plug device fitted inside the one end side of the housing portion;

a biasing force generating portion configured to generate a biasing force in a direction to distance the moving portion from the plug device and contract the bellows portion;

a safety valve configured to discharge the incompressible fluid within the supply passage to an outside when a biasing force is generated by the biasing force generating portion in a direction to contract the bellows portion while the supply tube is in a closed state, and a pressure of the incompressible fluid in the supply passage reaches or exceeds a predetermined level; and a discharge passage member that is arranged between the other end side of the housing portion and the supply tube and has therein a discharge passage for supplying the incompressible fluid from the supply passage to the safety valve, wherein a leading end of a safety valve side of the discharge passage is positioned outward beyond a radially outer edge of a mounting flange arranged to sandwich the flange portion between the mounting flange and the discharge passage member.

2. The coupling device according to claim 1, wherein the discharge passage member is attachable to and detachable from the other end side of the housing portion.

3. The coupling device according to claim 2, wherein the moving portion has an annular protruding portion that extends around the axis and in contact with an inner circumferential surface of the housing portion, and the biasing force generating portion is a first pressure chamber that is formed between a side of the annular protruding portion on the one end side and the inner circumferential surface of the housing portion and into which operational gas is introduced from the outside.

4. The coupling device according to claim 3, wherein a second pressure chamber into which operational gas is introduced from the outside is formed between a side of the annular protruding portion on the other end side and the inner circumferential surface of the housing portion, and the second pressure chamber is configured to generate a biasing force in a direction to bring the moving portion into contact with the plug device and expand the bellows portion.

5. The coupling device according to claim 1, wherein the moving portion has an annular protruding portion that extends around the axis and in contact with an inner circumferential surface of the housing portion, and the biasing force generating portion is a first pressure chamber that is formed between a side of the annular protruding portion on the one end side and the inner circumferential surface of the housing portion and into which operational gas is introduced from the outside.

6. The coupling device according to claim 5, wherein a second pressure chamber into which operational gas is introduced from the outside is formed between a side of the annular protruding portion on the other end side and the inner circumferential surface of the housing portion, and the second pressure chamber is configured to generate a biasing force in a direction to bring the moving portion into contact with the plug device and expand the bellows portion.

7. The coupling device according to claim 1, further comprising a detecting portion arranged inside the housing portion and configured to detect the incompressible fluid that flows out of the bellows portion.

* * * * *